(12) United States Patent
Schulter et al.

(10) Patent No.: US 12,536,689 B2
(45) Date of Patent: Jan. 27, 2026

(54) MINING UNLABELED IMAGES WITH VISION AND LANGUAGE MODELS FOR IMPROVING OBJECT DETECTION

(71) Applicant: NEC Laboratories America, Inc., Princeton, NJ (US)

(72) Inventors: Samuel Schulter, New York, NY (US); Vijay Kumar Baikampady Gopalkrishna, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 393 days.

(21) Appl. No.: 18/171,868

(22) Filed: Feb. 21, 2023

(65) Prior Publication Data

US 2023/0281858 A1 Sep. 7, 2023

Related U.S. Application Data

(60) Provisional application No. 63/400,766, filed on Aug. 25, 2022, provisional application No. 63/317,496, filed on Mar. 7, 2022.

(51) Int. Cl.
*G06T 7/70* (2017.01)
*G06T 3/40* (2024.01)
(Continued)

(52) U.S. Cl.
CPC ............... *G06T 7/70* (2017.01); *G06T 3/40* (2013.01); *G06V 10/25* (2022.01); *G06V 20/70* (2022.01);
(Continued)

(58) Field of Classification Search
CPC ........ G06V 10/25; G06V 20/70; G06V 10/82; G06V 10/764; G06V 20/00; G06V 10/26;
(Continued)

(56) References Cited

U.S. PATENT DOCUMENTS

2021/0158096 A1* 5/2021 Sinha ..................... G06N 3/045
2022/0004771 A1* 1/2022 Grancharov ........... G06V 20/41
(Continued)

OTHER PUBLICATIONS

Zhong, Yiwu, et al. "Regionclip: Region-based language-image pretraining." Proceedings of the IEEE/CVF conference on computer vision and pattern recognition. 2022. (Year: 2022).*

(Continued)

*Primary Examiner* — Michael Horabik
*Assistant Examiner* — Stefano Anthony Dardano
(74) *Attorney, Agent, or Firm* — Vincent Duffy; Joseph Kolodka (57) ABSTRACT

A method for object detection obtains, from a set of RGB images lacking annotations, a set of regions that include potential objects, a bounding box, and an objectness score indicating a region prediction confidence. The method obtains, by a region scorer for each region in the set, a category from a fixed set of categories and a confidence for the category responsive to the objectness score. The method duplicates each region in the set to obtain a first and a second patch. The method encodes the patches to obtain an image vector. The method encodes a template sentence using the category to obtain a text vector for each category. The method compares the image vector to the text vector via a similarity function to obtain a similarity probability based on the confidence. The method defines a final set of pseudo labels based on the similarity probability being above a threshold.

20 Claims, 6 Drawing Sheets (51) Int. Cl.
*G06V 10/25* (2022.01)
*G06V 20/70* (2022.01)
*G08G 1/16* (2006.01)

(52) U.S. Cl.
CPC ...... *G08G 1/16* (2013.01); *G06T 2207/10024* (2013.01); *G06T 2207/20132* (2013.01); *G06T 2207/30252* (2013.01)

(58) Field of Classification Search
CPC ............. G06T 7/70; G06T 2207/30261; G06T 2207/10024; G06T 2210/12; G06T 2207/20132; G06T 3/40; G06T 7/11; G06T 7/74; G06T 2210/22; G06T 9/00; G06T 2207/30252; G08G 1/16

See application file for complete search history.

(56) References Cited

U.S. PATENT DOCUMENTS

| | | | | |
|---|---|---|---|---|
| 2022/0391766 | A1* | 12/2022 | Acuna Marrero | G06N 20/00 |
| 2024/0119725 | A1* | 4/2024 | Zeng | G06V 10/82 |
| 2024/0338850 | A1* | 10/2024 | Jing | G06V 10/82 |

OTHER PUBLICATIONS

Ren, Shaoqing, et al. "Faster R-CNN: Towards real-time object detection with region proposal networks." IEEE transactions on pattern analysis and machine intelligence 39.6 (2016): 1137-1149. (Year: 2016).*

Changpinyo, Soravit, et al. "Conceptual 12m: Pushing web-scale image-text pre-training to recognize long-tail visual concepts." Proceedings of the IEEE/CVF conference on computer vision and pattern recognition. 2021. (Year: 2021).*

Radford, Alec, et al. "Learning transferable visual models from natural language supervision." International conference on machine learning. PmLR, 2021. (Year: 2021).*

Lin, Chuang, et al. "Learning object-language alignments for open-vocabulary object detection." arXiv preprint arXiv:2211.14843 (2022). (Year: 2022).*

Jia, Chao, et al. "Scaling up visual and vision-language representation learning with noisy text supervision." International conference on machine learning. PMLR, 2021. (Year: 2021).*

Bansal, A., Sikka, K., Sharma, G., Chellappa, R., & Divakaran, A. (Sep. 8, 2018). Zero-shot object detection. In Proceedings of the European Conference on Computer Vision (ECCV) (pp. 384-400).

Carion, N., Massa, F., Synnaeve, G., Usunier, N., Kirillov, A., & Zagoruyko, S. ;End-to-end object detection with transformers. In Computer Vision—ECCV 2020: 16th European Conference, Glasgow, UK, Aug. 23-28, 2020, Proceedings, Part I 16 (pp. 213-229). Springer International Publishing.

Gao, M., Xing, C., Niebles, J. C., Li, J., Xu, R., Liu, W., & Xiong, C. (Nov. 18, 2021). Towards open vocabulary object detection without human-provided bounding boxes. arXiv preprint arXiv:2111.09452.

Gu, X., Lin, T. Y., Kuo, W., & Cui, Y. (Apr. 28, 2021). Open-vocabulary object detection via vision and language knowledge distillation. arXiv preprint arXiv:2104.13921.

Hu, R., & Singh, A. (2021, Oct. 11). Unit: Multimodal multitask learning with a unified transformer. In Proceedings of the IEEE/CVF International Conference on Computer Vision (pp. 1439-1449).

Huynh, D., Kuen, J., Lin, Z., Gu, J., & Elhamifar, E. (Jun. 19, 2022). Open-vocabulary instance segmentation via robust cross-modal pseudo-labeling. In Proceedings of the IEEE/CVF Conference on Computer Vision and Pattern Recognition (pp. 7020-7031).

Kamath, A., Singh, M., LeCun, Y., Synnaeve, G., Misra, I., & Carion, N. (Oct. 11, 2021). Mdetr-modulated detection for end-to-end multi-modal understanding. In Proceedings of the IEEE/CVF International Conference on Computer Vision (pp. 1780-1790).

Li, B., Weinberger, K. Q., Belongie, S., Koltun, V., & Ranftl, R. (Apr. 25, 2022). Language-driven semantic segmentation. arXiv preprint arXiv:2201.03546.

Rahman, S., Khan, S., & Barnes, N. (Apr. 3, 2020). Improved visual-semantic alignment for zero-shot object detection. In Proceedings of the AAAI Conference on Artificial Intelligence (vol. 34, No. 07, pp. 11932-11939).

Rao, Y., Zhao, W., Chen, G., Tang, Y., Zhu, Z., Huang, G., ... & Lu, J. (2022, Jun. 19). Denseclip: Language-guided dense prediction with context-aware prompting. In Proceedings of the IEEE/CVF Conference on Computer Vision and Pattern Recognition (pp. 18082-18091).

Shi, H., Hayat, M., Wu, Y., & Cai, J. (Jun. 19, 2022). ProposalCLIP: unsupervised open-category object proposal generation via exploiting clip cues. In Proceedings of the IEEE/CVF Conference on Computer Vision and Pattern Recognition (pp. 9611-9620).

Siméoni, O., Puy, G., Vo, H. V., Roburin, S., Gidaris, S., Bursuc, A., ... & Ponce, J. (Nov. 25, 2021). Localizing objects with self-supervised transformers and No. labels. arXiv preprint arXiv:2109.14279.

Zhong, Y., Yang, J., Zhang, P., Li, C., Codella, N., Li, L. H., ... & Gao, J. (Jun. 19, 2022). Regionclip: Region-based language-image pretraining. In Proceedings of the IEEE/CVF Conference on Computer Vision and Pattern Recognition (pp. 16793-16803).

Zhou, C., Loy, C. C., & Dai, B. (Dec. 2, 2021). Denseclip: Extract free dense labels from clip. arXiv preprint arXiv:2112.01071.

* cited by examiner

MINING UNLABELED IMAGES WITH VISION AND LANGUAGE MODELS FOR IMPROVING OBJECT DETECTION

RELATED APPLICATION INFORMATION

This application claims priority to U.S. Provisional Patent Application No. 63/317,496, filed on Mar. 7, 2022, and U.S. Provisional Patent Application No. 63/400,766, filed on Aug. 25, 2022, incorporated herein by reference in its entirety.

BACKGROUND

Technical Field

The present invention relates to objection detection and more particularly to mining unlabeled images with vision and language models for improving object detection.

Description of the Related Art

Training accurate visual object detectors requires large amounts of annotated data in the form of images along with corresponding bounding boxes that outline the extent of each object and a category name. Collecting such annotations at a large scale is, however, a costly effort that requires a lot of human labor. This effort becomes even harder when the number of categories the detector should handle becomes large. Hence, there is a need for an approach to reduce the annotation cost of object detectors.

SUMMARY

According to aspects of the present invention, a computer-implemented method for object detection is provided. The method includes obtaining, from a set of RGB images lacking annotations, a set of regions in an RGB image that include one or more potential objects, a bounding box for the one or more potential objects, and an objectness score indicating a region prediction confidence. The method further includes obtaining, by a region scorer for each region in the set, a category from a fixed set of categories and a confidence for the category name responsive to the objectness score. The method also includes duplicating each region in the set to obtain a first and a second image patch. The method additionally includes encoding, by a visional and language (V & L) image encoder, the first and the second image patches to obtain an image vector. The method further includes encoding, by a V & L text encoder, a template sentence using the category to obtain a text vector for each category having a same dimensionality as the image vector. The method also includes comparing the image vector to the text vector via a similarity function to obtain a similarity probability based on the confidence. The method additionally includes defining a final set of pseudo labels based on the similarity probability being above a user-defined similarity probability threshold.

According to other aspects of the present invention, a computer program product for object detection is provided. The computer program product includes a non-transitory computer readable storage medium having program instructions embodied therewith. The program instructions are executable by a computer to cause the computer to perform a method. The method includes obtaining, by a hardware processor of the computer from a set of RGB images lacking annotations, a set of regions in an RGB image that include one or more potential objects, a bounding box for the one or more potential objects, and an objectness score indicating a region prediction confidence. The method further includes obtaining, by a region scorer implemented by the hardware processor for each region in the set, a category from a fixed set of categories and a confidence for the category name responsive to the objectness score. The method also includes duplicating, by the hardware processor, each region in the set to obtain a first and a second image patch. The method additionally includes encoding, by a visional and language (V & L) image encoder implemented by the hardware processor, the first and the second image patches to obtain an image vector. The method further includes encoding, by a V & L text encoder implemented by the hardware processor, a template sentence using the category to obtain a text vector for each category having a same dimensionality as the image vector. The method also includes comparing, by the hardware processor, the image vector to the text vector via a similarity function to obtain a similarity probability based on the confidence. The method additionally includes defining, by the hardware processor, a final set of pseudo labels based on the similarity probability being above a user-defined similarity probability threshold.

According to still other aspects of the present invention, a computer processing system for object detection is provided. The system includes a memory device for storing program code. The system further includes a hardware processor operatively coupled to the memory device for storing program code to obtain, from a set of RGB images lacking annotations, a set of regions in an RGB image that include one or more potential objects, a bounding box for the one or more potential objects, and an objectness score indicating a region prediction confidence. The hardware processor further runs the program code to obtain, for each region in the set, a category from a fixed set of categories and a confidence for the category name responsive to the objectness score. The hardware processor also runs the program code to duplicate each region in the set to obtain a first and a second image patch. The hardware processor additionally runs the program code to encode, by a visional and language (V & L) image encoder implemented by the hardware processor, the first and the second image patches to obtain an image vector. The hardware processor further runs the program code to encode, by a V & L text encoder implemented by the hardware processor, a template sentence using the category to obtain a text vector for each category having a same dimensionality as the image vector. The hardware processor also runs the program code to compare the image vector to the text vector via a similarity function to obtain a similarity probability based on the confidence. The hardware processor additionally runs the program code to define a final set of pseudo labels based on the similarity probability being above a user-defined similarity probability threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to mining unlabeled images with vision and language models for improving object detection.

Embodiments of the present invention leverage existing vision-and-language models to create better pseudo labels. Such vision-and-language models are trained on large-scale pairs of images and corresponding natural text captions, which do not require human annotations in the form of bounding boxes. The generated pseudo labels can then be used to train object detectors which are more accurate, robust and have an increased label space. The annotation cost is much smaller than what would be required to train the same detector in a fully supervised way.

Embodiments of the present invention provide a method that leverages the rich semantics available in recent vision and language models to localize and categories objects in unlabeled images, effectively generating pseudo labels for object detection. Starting with a generic and class-agnostic object proposal mechanism, the present invention uses vision and language models to categorize each region of an image into any object category that is required for downstream tasks. The value of the generated pseudo labels is demonstrated in two specific tasks, open-vocabulary detection, where a model needs to generalize to unseen object categories, and semi-supervised object detection, where additional unlabeled images can be used to improve the model.

Figure 1:
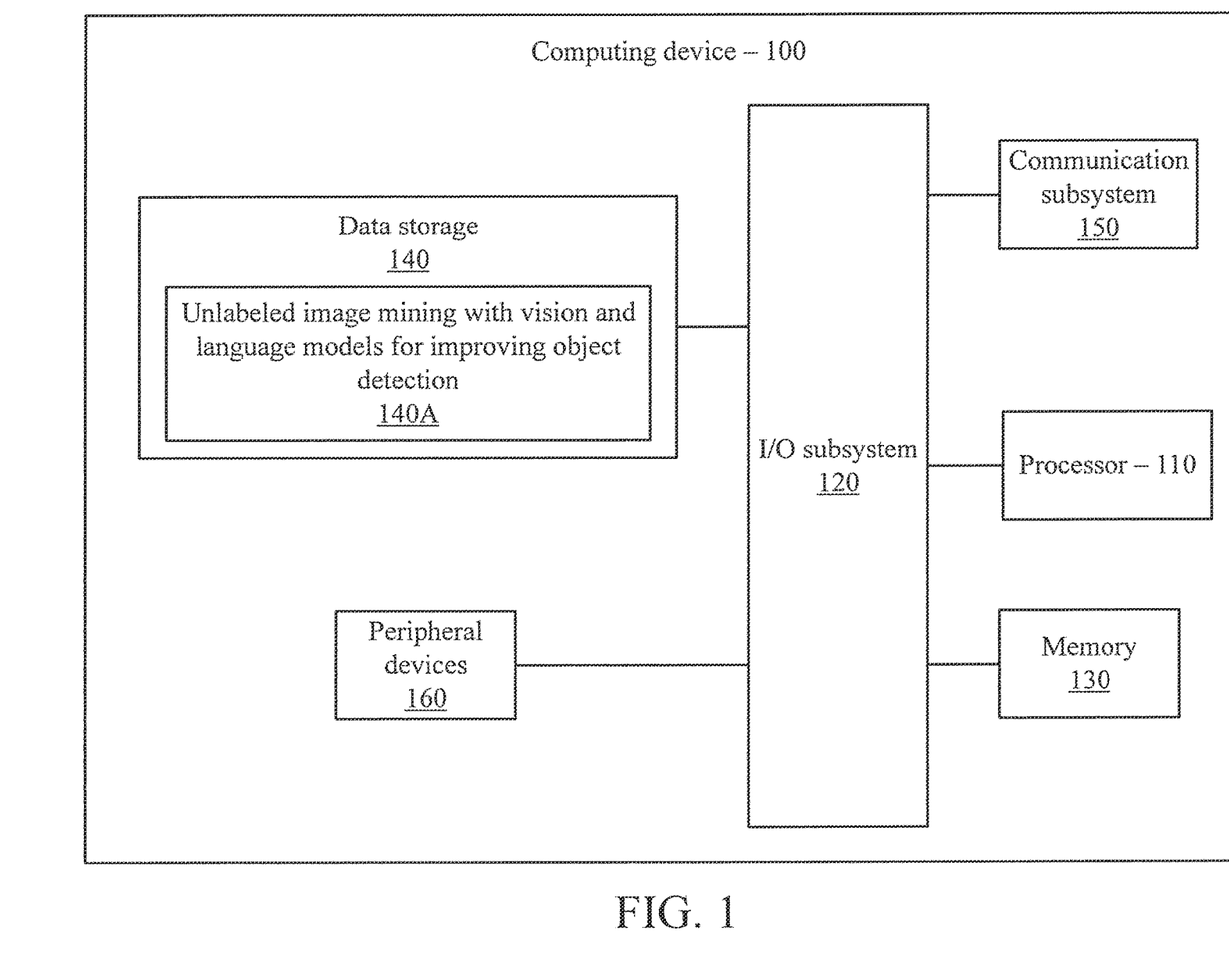
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform unlabeled image mining with vision and language models for improving object detection.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for unlabeled image mining with vision and language models for improving object detection. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices. As further example, the peripheral devices 160 can include a speech recognition system for recognizing speech to be processed for open vocabulary detection and other applications, and/or an Advanced Driver Assistance System (ADAS) for vehicle control such as collision avoidance and normal driving.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
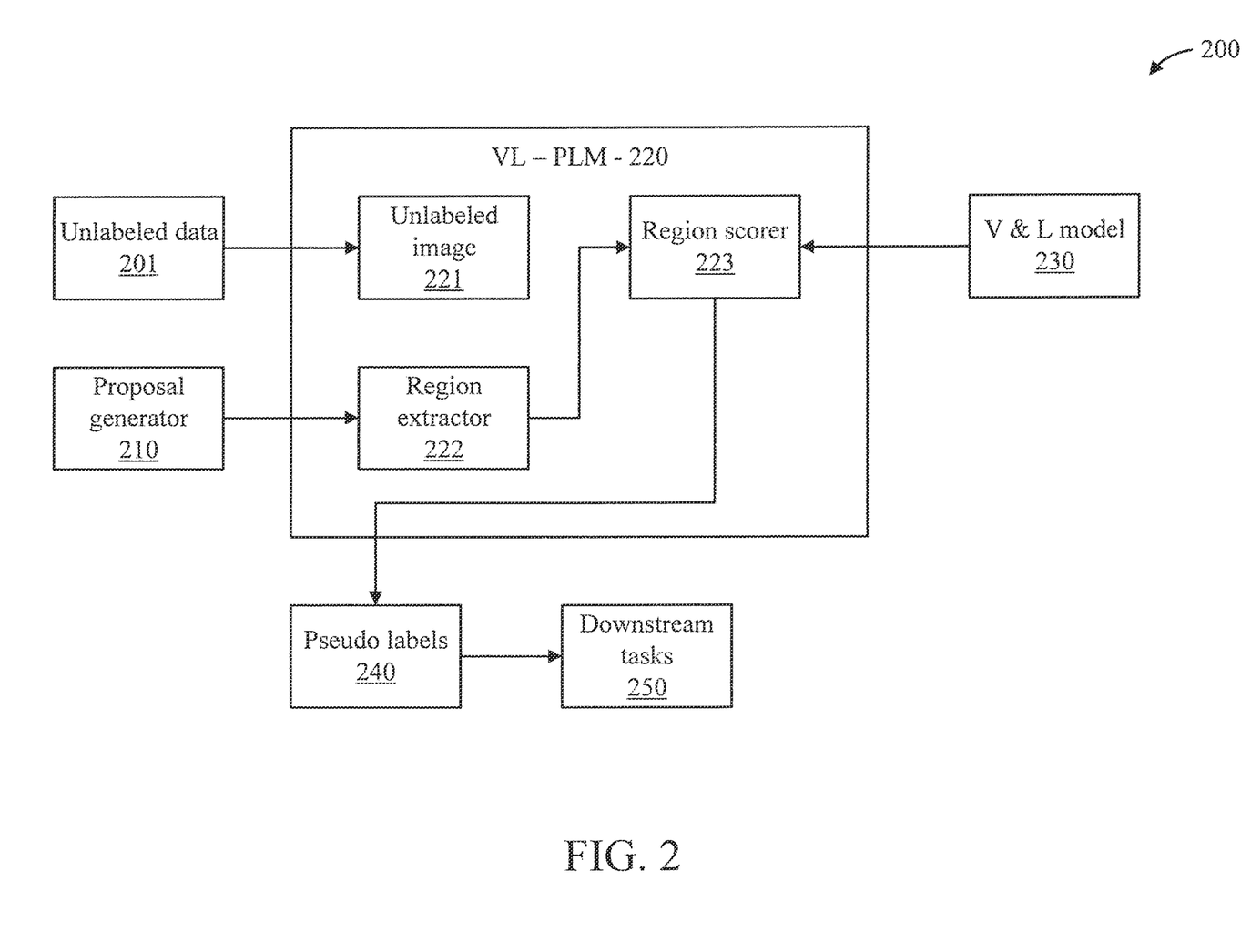
FIG. 2 is a block diagram showing an exemplary system, in accordance with an embodiment of the present invention.

FIG. 2 is a block diagram showing an exemplary system 200, in accordance with an embodiment of the present invention.

The system 200 includes and/or otherwise involves unlabeled data 201, a proposal generator 210, a vision and language product lifecycle manager (PLM) 220, a vision and language (V & L) model 230, pseudo-labels 240, and downstream tasks 250.

The vision and language product lifecycle manager 220 includes an unlabeled image 221, a region extractor 222, and a region scorer 223.

The unlabeled data 201 includes a set of RGB (Red, Green, Blue) images without any additional annotations.

The proposal generator 210 is a class-agnostic proposal mechanism. Any existing mechanism can be used that takes an image and returns bounding boxes of potential objects.

The vision and language model 230 is a pre-trained vision and language model, which was trained with large-scale pairs of images and corresponding captions. The V & L model 230 includes an image encoder and a text encoder.

Regarding the vision and language model PLM 220, the same includes one unlabeled image 221 from the set of unlabeled images 201.

Further regarding the vision and language model PLM 220, the same includes the region extractor 222 which applies the proposal generator 210 on the unlabeled image 221 and returns a set of regions R. Each region comes with a bounding box (4 coordinates in the 2D image space) and an "objectness" score that indicates confidence of the proposal generator about its prediction.

In an embodiment, the V & L model 230 to give each region an object category name and a confidence score. Prior art typically used an existing object detector trained on a small set of annotated data with a fixed set of known categories. The use of a V & L model is more robust because it was trained on a larger corpus of imagery, and it provides a richer set of category names.

Further regarding the vision and language model PLM 220, the same includes a region scorer 233 that applies the V & L model 230 on each of the regions to estimate a category name and a confidence, which then gives final pseudo labels 240.

The final set of pseudo labels 240 is defined as the set of regions coming from VL-PLM 220 after applying non-maxima-suppression (NMS) and only keeping regions with a final score above a certain, user-defined, threshold. In an embodiment, the default value can be 0.8. Of course, other default values can be used, while maintaining the spirit of the present invention.

The pseudo labels 240 can then be used for any downstream task 250. The pseudo labels can be directly used as the final output to mine through a set of unlabeled images and find objects of certain categories. The pseudo labels 240 can also be used to train object detection systems with a combination of labeled data and our pseudo labels 240, for instance in semi-supervised object detection or open-vocabulary detection.

Figure 3:
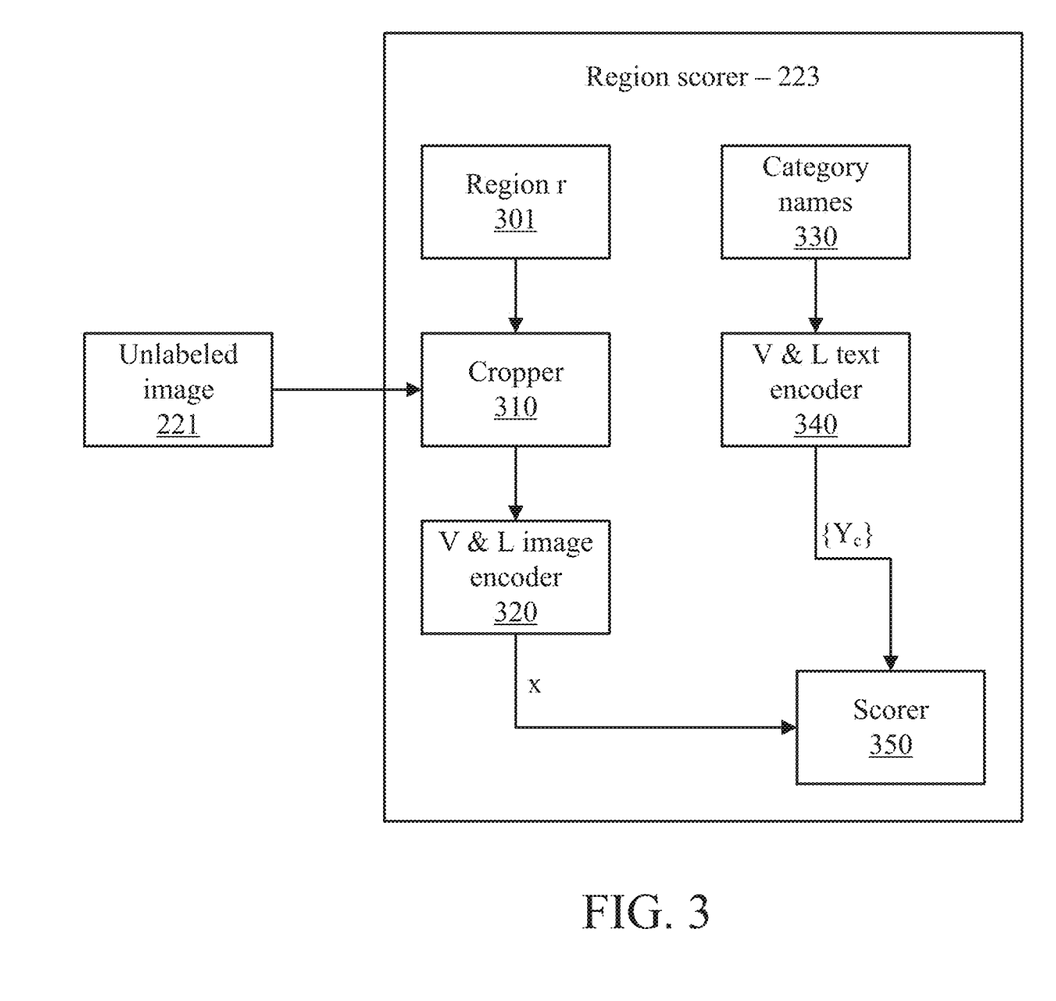
FIG. 3 is a block diagram further showing the region scorer of FIG. 2, in accordance with an embodiment of the present invention.

FIG. 3 is a block diagram further showing the region scorer 233 of FIG. 2, in accordance with an embodiment of the present invention.

The region scorer 233 includes and/or otherwise a region r 301, a cropper 310, a V & L image encoder 320, category names 330, a V & L text encoder 340, and a scorer 350.

Each region r (from R) 301 is first duplicated, one with the original scale (r1), the other 1.5 times larger with the same center of the bounding box (r2). Then, two image patches are cropped 310 from the image according to the two regions (r1 and r2). The image patches are rescaled to fit the input of the V & L image encoder 320 (depends on the chosen V & L model) and put through the V & L image encoder 320, which returns a vector x of dimensionality defined by the V & L model 230.

For a given list of category names (like "car", "person", "apple") 330, which can be defined arbitrarily for any desired task, a template sentence is created for each category name, c, as "A photo of a <CLS>", where "<CLS>" is replaced with the category name c. The sentences of all categories are put through the V & L text encoder 340, which returns a set of vectors $y_c$, one for each category c, all of them of the same dimensionality as x.

The image vector x is then compared with each text vector $y_c$ via cosine similarity by the scorer 350. A SoftMax function is then applied over all similarities between x and $y_c$, which gives a probability (between 0 and 1) for a region r to be of category c. In an embodiment, the present invention takes the maximum probability and takes the average of this maximum probability with the score (also between 0 and 1) of the region r provided by the proposal generator 210 applied to the region extractor 222.

Figure 4:
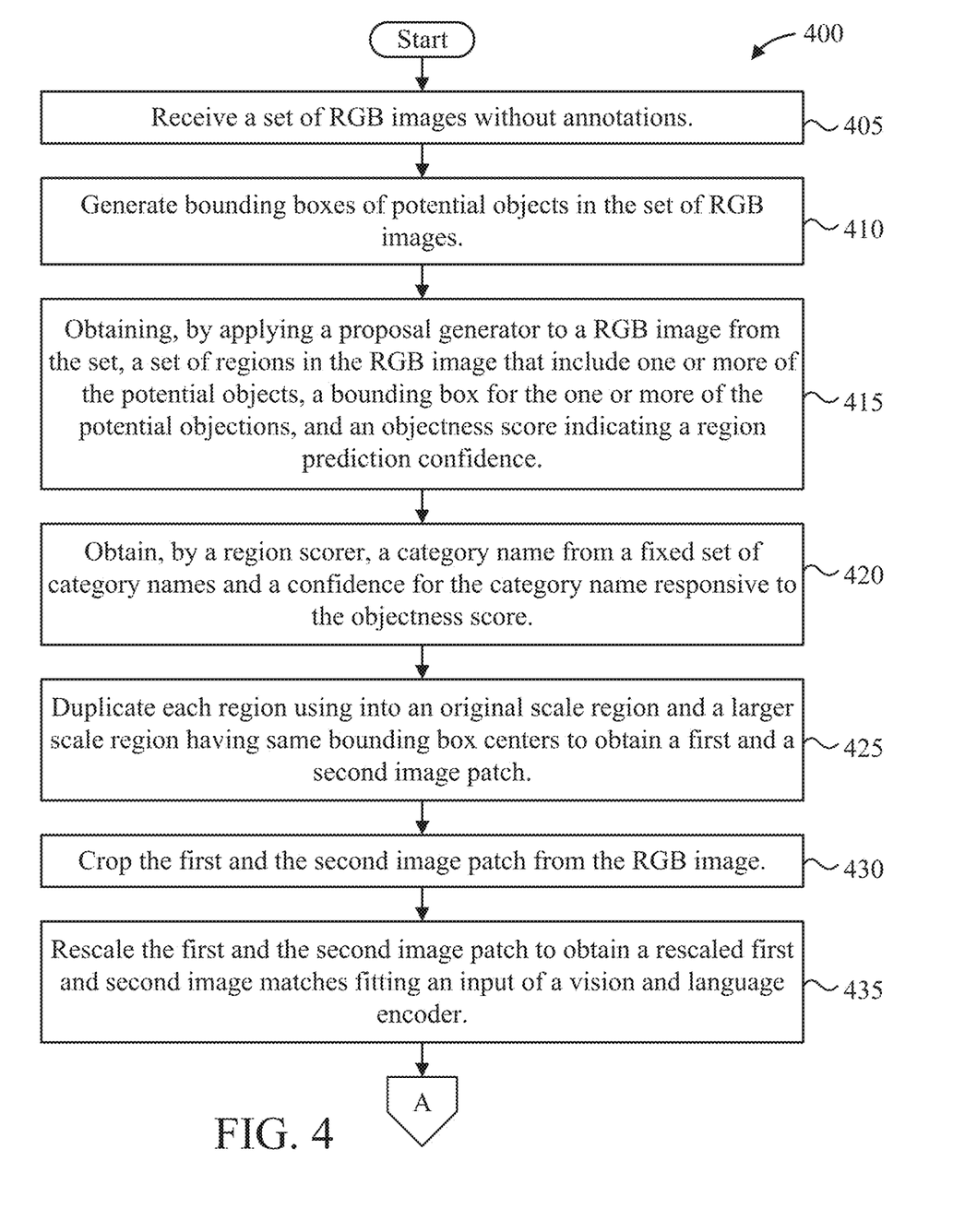
FIGS. 4-5 are flow diagrams showing an exemplary method for object detection, in accordance with an embodiment of the present invention.
Figure 5:
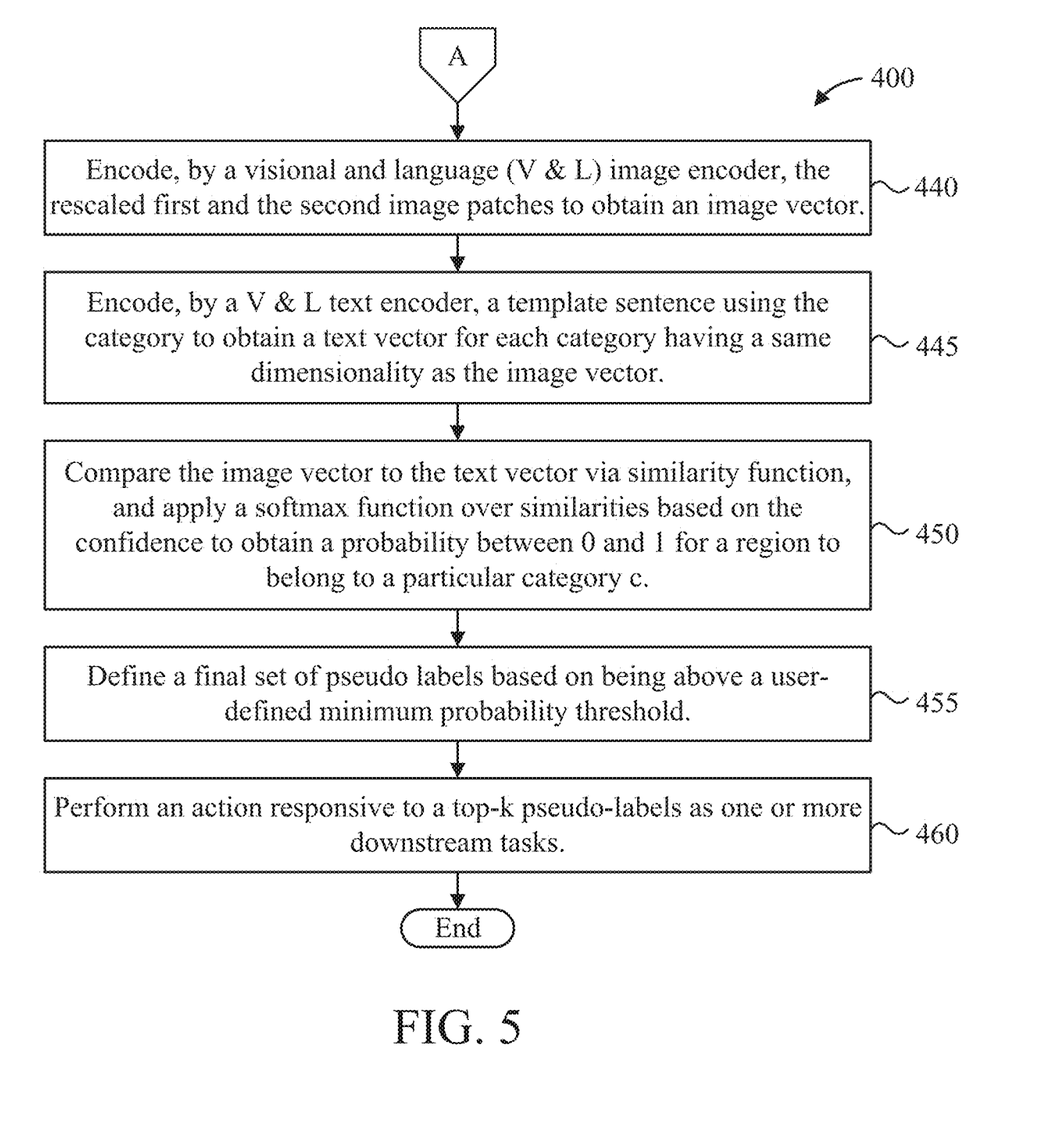

FIGS. 4-5 are flow diagrams showing an exemplary method 400 for object detection, in accordance with an embodiment of the present invention.

At block 405, receive a set of RGB images without annotations.

At block 410, generate bounding boxes of potential objects in the set of RGB images.

At block 415, obtaining, by applying a proposal generator to a RGB image from the set, a set of regions in the RGB image that include one or more of the potential objects, a bounding box for the one or more of the potential objections, and an objectness score indicating a region prediction confidence.

At block 420, obtain, by a region scorer, a category name from a fixed set of category names and a confidence for the category name responsive to the objectness score.

At block 425, duplicate each region using into an original scale region and a larger scale region having same bounding box centers to obtain a first and a second image patch. In an embodiment, the larger scale is 1.5×. Of course, other scales can also be used, while maintaining the spirit of the present invention.

At block 430, crop the first and the second image patch from the RGB image.

At block 435, rescale the first and the second image patch to obtain a rescaled first and second image matches fitting an input of a vision and language encoder.

At block 440, encode, by a visional and language (V & L) image encoder, the rescaled first and the second image patches to obtain an image vector.

At block 445, encode, by a V & L text encoder, a template sentence using the category to obtain a text vector for each category having a same dimensionality as the image vector.

At block 450, compare the image vector to the text vector via similarity function, and apply a softmax function over similarities based on the confidence to obtain a probability between 0 and 1 for a region to belong to a particular category c.

At block 455, define a final set of pseudo labels based on being above a user-defined minimum probability threshold.

At block 460, perform an action responsive to a top-k pseudo-labels as one or more downstream tasks. For example, a vehicle system such as steering, braking, and accelerating, can be controlled for vehicle impact avoidance. The method can, in some embodiments, be deemed directed to object detection for impact avoidance.

Figure 6:
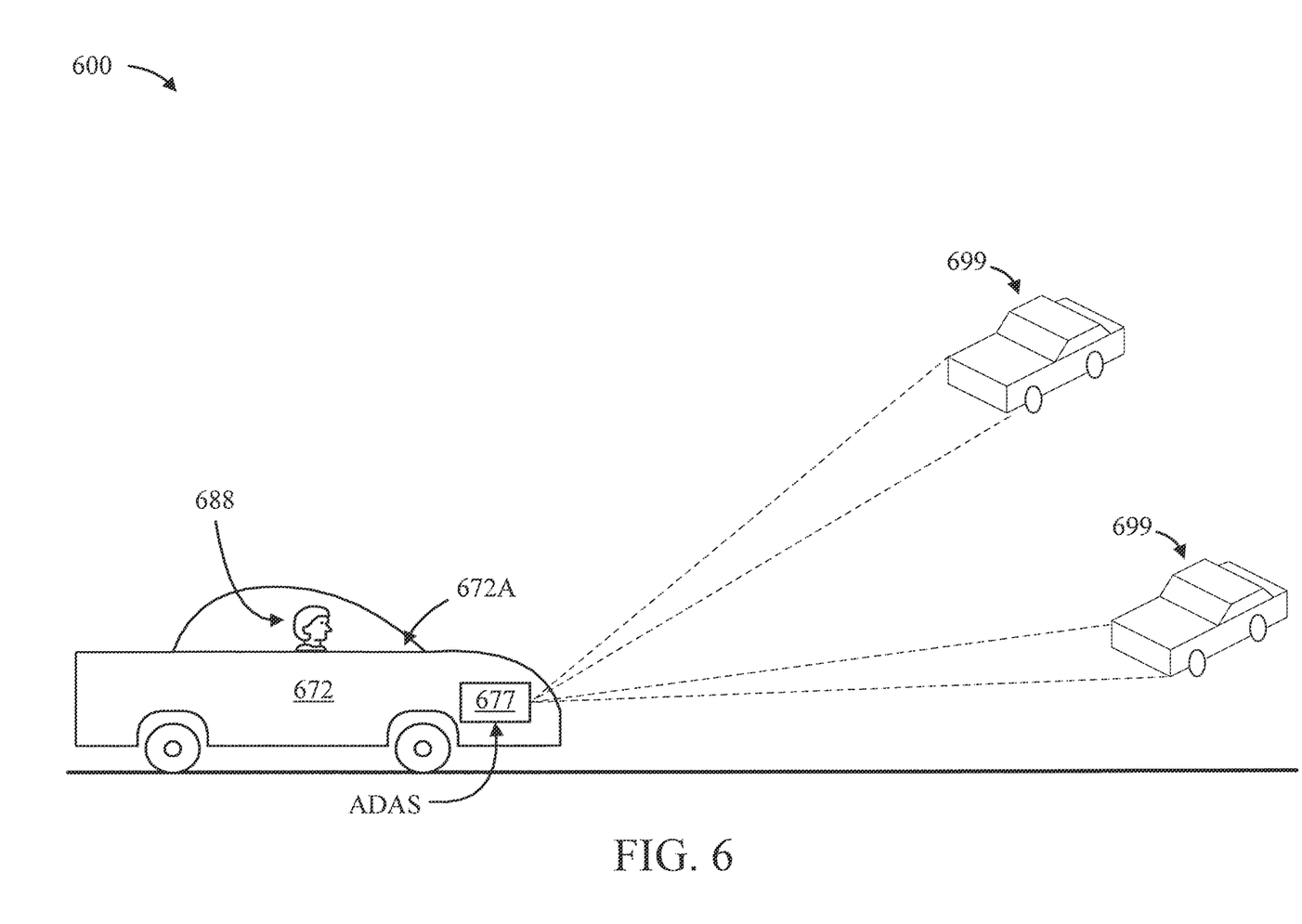
FIG. 6 is a block diagram showing an exemplary environment to which the present invention can be applied, in accordance with an embodiment of the present invention.

FIG. 6 is a block diagram showing an exemplary environment 600 to which the present invention can be applied, in accordance with an embodiment of the present invention.

In the environment 600, a user 688 is located in a scene with multiple objects 699, each having their own locations and trajectories. The user 688 is operating a vehicle 672 (e.g., a car, a truck, a motorcycle, etc.) having an ADAS 677.

The ADAS 677 receives an ordinal prediction.

Responsive to the ordinal prediction, a vehicle controlling decision is made. To that end, the ADAS 677 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 677) may interface with the user through one or more systems of the vehicle 672 that the user is operating. For example, the system of the present invention can provide the user information through a system 672A (e.g., a display system, a speaker system, and/or some other system) of the vehicle 672. Moreover, the system of the present invention (e.g., system 677) may interface with the vehicle 672 itself (e.g., through one or more systems of the vehicle 672 including, but not limited to, a steering system, a braking system, an acceleration system, a steering system, a lighting (turn signals, headlamps) system, etc.) in order to control the vehicle and cause the vehicle 672 to perform one or more actions. In this way, the user or the vehicle 672 itself can navigate around these objects 699 to avoid potential collisions there between. The providing of information and/or the controlling of the vehicle can be considered actions that are determined in accordance with embodiments of the present invention.

While described with respect to an ADAS, the present invention can be applied to a myriad of applications involving, e.g., a trajectory. For example, navigation involving automated agents, robots, assistive technologies for blind people, and/or so forth can be exploited by embodiments of the present invention.

Training object detectors with unlabeled data:

Unlabeled data comes in many different forms for object detectors. In semi-supervised object detection, there is a set of fully-labeled images $I_L$ with annotations for the full label space S, as well as unlabeled images $I_U$, with $I_L \cap I_U = \emptyset$. In open-vocabulary detection, there are partly-labeled images with annotations for the set of base categories $S_B$, but without annotations for the unknown/novel categories $S_N$. Note that partly-labeled images are therefore included in both $I_L$ and $I_U$, i.e., $I_L \cap I_U \neq \emptyset$. Yet another example is unsupervised domain adaptation where fully-labeled images in the source domain are given, but only unlabeled images are available in the target domain.

A popular and successful approach to learn from unlabeled data is via pseudo labels. Recent semi-supervised object detection methods follow this approach by first training a teacher model on the limited ground truth data, then generating pseudo labels for the unlabeled data, and finally training a student model. In the following, a general training strategy is described for object detection to handle different forms of unlabeled data.

A generic loss function for an object detector with parameters θ over both labeled and unlabeled images is defined as follows:

$$\mathcal{L}(\theta, I) = \frac{1}{N_I} \sum_{i=1}^{N_I} [I_i \in I_L] l_s(\theta, I_i) + \alpha [I_i \in I_U] l_u(\theta, I_i) \quad (1)$$

where α is a hyperparameter to balance supervised ls and unsupervised $l_u$ losses and [•] is the indicator function returning either 0 or 1 depending on the condition. Note again that $I_i$ can be included in both $I_L$ and $I_U$.

Object detection ultimately is a set prediction problem and to define a loss function, the set of predictions (class probabilities and bounding box estimates) need to be matched with the set of ground truth boxes. Different options exist to find a matching but it is mainly defined by the similarity (IoU) between predicted and ground truth boxes. The present invention defines the matching for prediction i as σ(i), which returns a ground truth index j if successfully matched or nil otherwise. The supervised loss $l_s$ includes a standard cross-entropy loss for the classification $l_{cls}$ and an $\ell_1$ loss for the box regression $l_{reg}$. Given $I \in \mathcal{I}$, $l_s$ is defined as follows:

$$l_s(\theta, I) = \frac{1}{N^*} \sum_i l_{cls}(C_i^\theta(I), c_{\sigma(i)}^*) + [\sigma(i) \neq nil] l_{reg}(T_i^\theta(I), t_{\sigma(i)}^*) \quad (2)$$

where $N^*$ is the number of predicted bounding boxes. $C_i^\theta(\cdot)$ and $T_i^\theta(\cdot)$ are the predicted class distributions and bounding boxes of the object detector. The corresponding (matched) ground truth is defined as $c_{\sigma(i)}^*$ and $t_{\sigma(i)}^*$, respectively.

The unsupervised loss $l_u$ is similarly defined, but uses pseudo labels with high confidence as supervision signals:

$$l_u(\theta, I) = \frac{1}{N^u} \sum_i [\max(p_{\sigma(i)}^u) \geq r] \cdot (l_{cls}(C_i^\theta(I), \hat{c}_{\sigma(i)}^u) + [\sigma(i) \neq nil] l_{reg}(T_i^\theta(I), t_{\sigma(i)}^u)) \quad (3)$$

Here, $p_{\sigma(i)}^u$ defines the probability distribution over the label space of the pseudo label matched with prediction i and $N^u$ is the number of adopted pseudo labels, i.e., $N^u = \Sigma_i[\max(p_{\sigma(i)}^u) \geq \tau]$. Pseudo labels for the classification and the box regression losses are $\hat{c}_{\sigma(i)}^u = \arg\max(p_{\sigma(i)}^u)$ and $t_{\sigma(i)}^u$, respectively.

The key to successful training object detectors from unlabeled data are accurate pseudo labels. Hereinafter, VL-PLM is described, to leverage V & L models as external models to exploit unlabeled data for generating pseudo labels.

VL-PLM: Pseudo Labels from Vision & Language Models

V & L models are trained on large scale datasets with image-text pairs that cover a diverse set of image domains and rich semantics in natural text. Moreover, the image-text pairs can be obtained without costly human annotation by using web-crawled data (images and corresponding alt-texts). Thus, V & L models are ideal sources of external knowledge to generate pseudo labels for arbitrary categories, which can be used for downstream tasks like open-vocabulary or semi-supervised object detection.

Overview: First, the present invention feeds an unlabeled image into a two-stage class-agnostic detector to region proposals. The present invention then crops image patches based on those regions and feeds them into the CLIP image-encoder to obtain an embedding in the CLIP vision-and-language space. Using the corresponding CLIP text-encoder and template text prompts, the present invention generates embeddings for category names that are desired for the specific task. For each region, the present invention computes the similarities between the region embedding and the text embeddings via a dot product and softmax the similarities to obtain a distribution over the category names. The present invention picks the highest probability in the distribution as the confidence and regards the corresponding category as the pseudo classification label for that region.

There are two key challenges in the framework of the present invention: (1) Generating robust proposals for novel categories, required by open-vocabulary detection, and (2) overcoming the poor localization quality of the raw CLIP model. Simple but effective solutions are introduced to address the two challenges in the following.

Generating robust and class-agnostic region proposals: To benefit tasks like open vocabulary detection with the unlabeled data, the proposal generator should be able to locate not only objects of categories seen during training but also of objects of novel categories. While unsupervised candidates like selective search exist, these are often time-consuming and generate many noisy boxes. The region proposal network (RPN) of a two-stage detector generalizes well for novel categories. Moreover, it has been found that the RoI head is able to improve the localization of region proposals, which is elaborated in the next section. Thus, the present invention trains a standard two-stage detector, e.g., Faster-RCNN, as a proposal generator using available ground truth, which are annotations of base categories for open vocabulary detection and annotations from the small fraction of annotated images in semi-supervised detection. To further improve the generalization ability, the present invention ignores the category information of the training set and trains a class-agnostic proposal generator.

Generating pseudo labels with a V & L model: Directly applying CLIP on cropped region proposals yields low localization quality. Here, it is demonstrated how to improve the localization ability with a two-stage class-agnostic proposal generator in two ways. Firstly, it is noted that the RPN score is a good indicator for localization quality of region proposals. Positive correlation exists between RPN and IoU scores. The present invention leverages this observation and averages the RPN score with those of the CLIP predictions. Secondly, the present invention removes thresholding and NMS of the proposal generator and feed proposal boxes into the RoI head multiple times. It is observed that it pushes redundant boxes closer to each other by repeating the RoI head. In this way, the present invention encounter better located bounding boxes and provides better pseudo labels.

To further improve the quality of the pseudo labels, the present invention adopts the multi-scale region embedding from CLIP. Moreover, the present invention employs a high threshold to pick pseudo labels with high confidence. The confidence score of the pseudo label for the region R is formulated as $\bar{c}_i^u = [s_i^u \geq \tau] \cdot s_i^u$, with $$s_i^u = \frac{s_{RPN}(R_i) \max(p_i^u)}{2} \quad (4)$$

where $S_{RPN}(\cdot)$ denotes the RPN score. The prediction probability distribution $p_i^u$ is defined as follows:

$$p_i^u = \text{softman } \{\varnothing(E_{im}(R_i) + E_{im}(R_i^{1.5\times})) \cdot E_{txt} \text{ (Categories)}^T\} \quad (5)$$

Here, $R_i^{1.5\times}$ is a region cropped by 1.5× the size of $R_i$. $E_{im}$ and $E_{txt}$ are the image and text encoders of CLIP, respectively, and $\varnothing(x) = x/\|x\|$. If $\bar{c}_i^u = 0$, then $R_i$ is excluded from the pseudo labels.

Finally, it is briefly described how the pseudo labels are used that are generated from unlabeled data for two specific downstream tasks focused on in this work.

Open-vocabulary detection: In this task, the detector has access to images with annotations for base categories and needs to generalize to novel categories. The present invention leverages the data of the base categories to train the proposal generator and take the names of novel categories as the input texts of the CLIP text-encoder in aforementioned pseudo label generation process. Then, the present invention trains the detector with both base ground truth and novel pseudo labels.

Semi-supervised object detection: In this task, relevant methods usually train a teacher model using ground truth from the limited set of labeled images, and then generate pseudo labels with the teacher on the unlabeled images. The present invention also generates those pseudo labels and merges them with pseudo labels from the VL-PLM. Thus, the student model is trained on available ground truth and pseudo labels from both the V & L-based approach and the teacher model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for object detection, comprising:
    obtaining, from a set of RGB images lacking annotations, a set of regions in an RGB image that include one or more potential objects, a bounding box for the one or more potential objects, and an objectness score indicating a region prediction confidence;
    obtaining, by a region scorer for each region in the set, a category from a fixed set of categories and a confidence for the category name calculated as:

$$S_i^u = \frac{S_{RPN}(R_i) + \max(p_i^u)}{2}$$

where $S_{RPN}(R_i)$ is the objectness score for a region $R_i$ and $p_i^u$ is a probability distribution for the category name;
    duplicating each region in the set to obtain a first and a second image patch;
    encoding, by a visional and language (V & L) image encoder, the first and the second image patches to obtain an image vector;
    encoding, by a V & L text encoder, a template sentence using the category to obtain a text vector for each category having a same dimensionality as the image vector;
    comparing the image vector to the text vector via a similarity function to obtain a similarity probability based on the confidence; and
    defining a final set of pseudo labels based on the similarity probability being above a user-defined similarity probability threshold.

2. The computer-implemented method of claim 1, further comprising discarding any regions equal to and below the user-defined threshold probability.

3. The computer-implemented method of claim 1, further comprising duplicating each region using into an original scale region and a larger scale region having same bounding box centers to obtain the first and the second image patch.

4. The computer-implemented method of claim 3, wherein the larger scale region is 1.5× larger than the original scale region.

5. The computer-implemented method of claim 1, further comprising rescaling the first and the second image patch to obtain a rescaled first and second image patches fitting an input of the vision and language encoder.

6. The computer-implemented method of claim 1, further comprising applying a softmax function over similarities between the image vector and the text vector to obtain a probability between 0 and 1 for a region to belong to a particular category c.

7. The computer-implemented method of claim 1, wherein a dimensionality of the image vector is defined by a V & L model comprising the V & L image and text encoders, the V & L model trained on pairs of images and corresponding captions.

8. The computer-implemented method of claim 1, wherein the image vector and the text vector have a same dimensionality.

9. The computer-implemented method of claim 1, wherein a maximum similarity probability is averaged with the confidence score, the confidence score having a value between 0 and 1.

10. The computer-implemented method of claim 1, further comprising training an object detection system with a combination of labeled data and the pseudo labels for open-vocabulary detection.

11. The computer-implemented method of claim 1, further comprising cropping the first and the second image patch from the RGB image prior to an encoding.

12. The computer-implementing method of claim 1, further comprising automatically controlling a vehicle system for collision avoidance responsive to a pseudo label predicting an impending collision.

13. A computer program product for object detection, the computer program product comprising a non-transitory computer readable storage medium having program instructions embodied therewith, the program instructions executable by a computer to cause the computer to perform a method comprising:
    obtaining, by a hardware processor of the computer from a set of ROB images lacking annotations, a set of regions in an RGB image that include one or more potential objects, a bounding box for the one or more potential objects, and an objectness score indicating a region prediction confidence;

obtaining, by a region scorer implemented by the hardware processor for each region in the set, a category from a fixed set of categories and a confidence for the category name calculated as:

$$S_i^u = \frac{S_{RPN}(R_i) + \max(p_i^u)}{2}$$

where $S_{RPN}(R_i)$ is the objectness score for a region $R_i$ and $p_i^u$ is a probability distribution for the category name;

duplicating, by the hardware processor, each region in the set to obtain a first and a second image patch;

encoding, by a visional and language (V& L) image encoder implemented by the hardware processor, the first and the second image patches to obtain an image vector;

encoding, by a V&L text encoder implemented by the hardware processor, a template sentence using the category to obtain a text vector for each category having a same dimensionality as the image vector;

comparing, by the hardware processor, the image vector to the text vector via a similarity function to obtain a similarity probability based on the confidence; and defining, by the hardware processor, a final set of pseudo labels based on the similarity probability being above a user-defined similarity probability threshold.

14. The computer program product of claim 13, wherein the method further comprises discarding any regions equal to and below the user-defined threshold probability.

15. The computer program product of claim 13, wherein the method further comprises duplicating each region using into an original scale region and a larger scale region having same bounding box centers to obtain the first and the second image patch.

16. The computer program product of claim 15, wherein the larger scale region is 1.5× larger than the original scale region.

17. The computer program product of claim 13, wherein the method further comprises rescaling the first and the second image patch to obtain a rescaled first and second image patches fitting an input of the vision and language encoder.

18. The computer program product of claim 13, wherein the method further comprises applying a softmax function over similarities between the image vector and the text vector to obtain a probability between 0 and 1 for a region to belong to a particular category c.

19. The computer program product of claim 13, wherein a dimensionality of the image vector is defined by a V & L model comprising the V & L image and text encoders, the V & L model trained on pairs of images and corresponding captions.

20. A computer processing system fir object detection, comprising:
a memory device for storing program code; and
a hardware processor operatively coupled to the memory device for storing program code to:
obtain, from a set of RGB images lacking annotations, a set of regions in an RGB image that include one or more potential objects, a bounding box for the one or more potential objects, and an objectness score indicating a region prediction confidence
obtain, for each region in the set, a category from a fixed set of categories and a confidence for the category name calculated as:

$$S_i^u = \frac{S_{RPN}(R_i) + \max(p_i^u)}{2}$$

where $S_{RPN}(R_i)$ is the objectness score for a region $R_i$ and $p_i^u$ is a probability distribution for the category name;

duplicate each region in the set to obtain a first and a second image patch;

encode, by a visional and language (V& L) image encoder implemented by the hardware processor, the first and the second image patches to obtain an image vector;

encode, by a V&L text encoder implemented by the hardware processor, a template sentence using the category to obtain a text vector for each category having a same dimensionality as the image vector;

compare the image vector to the text vector via a similarity function to obtain a similarity probability based on the confidence; and define a final set of pseudo labels based on the similarity probability being above a user-defined similarity probability threshold.

* * * * *